United States Patent Office 3,276,796
Patented Oct. 4, 1966

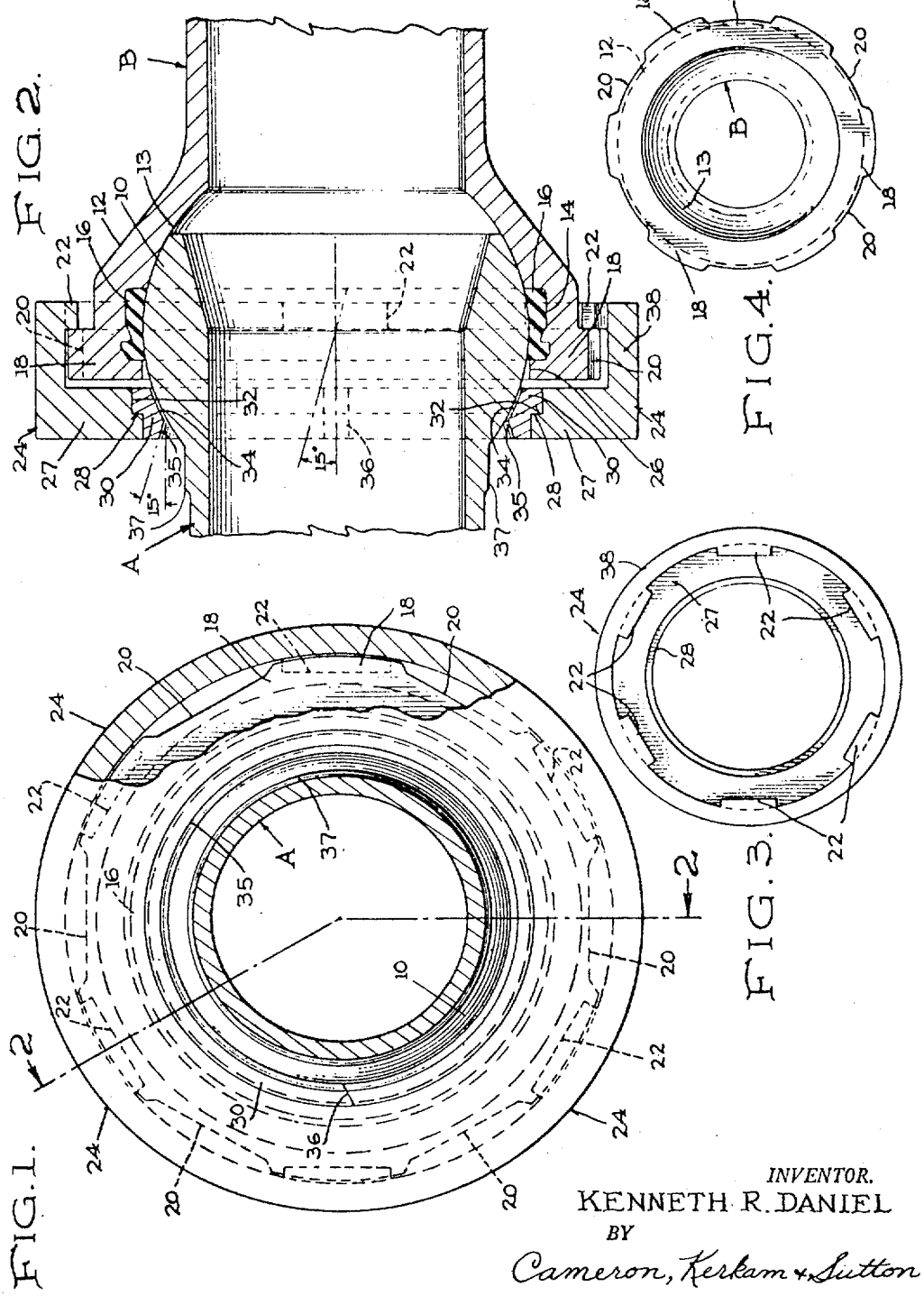

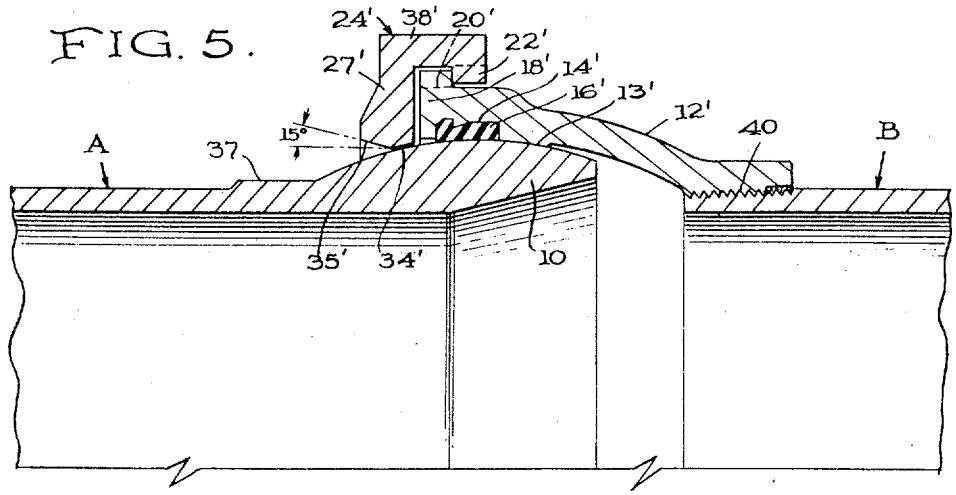
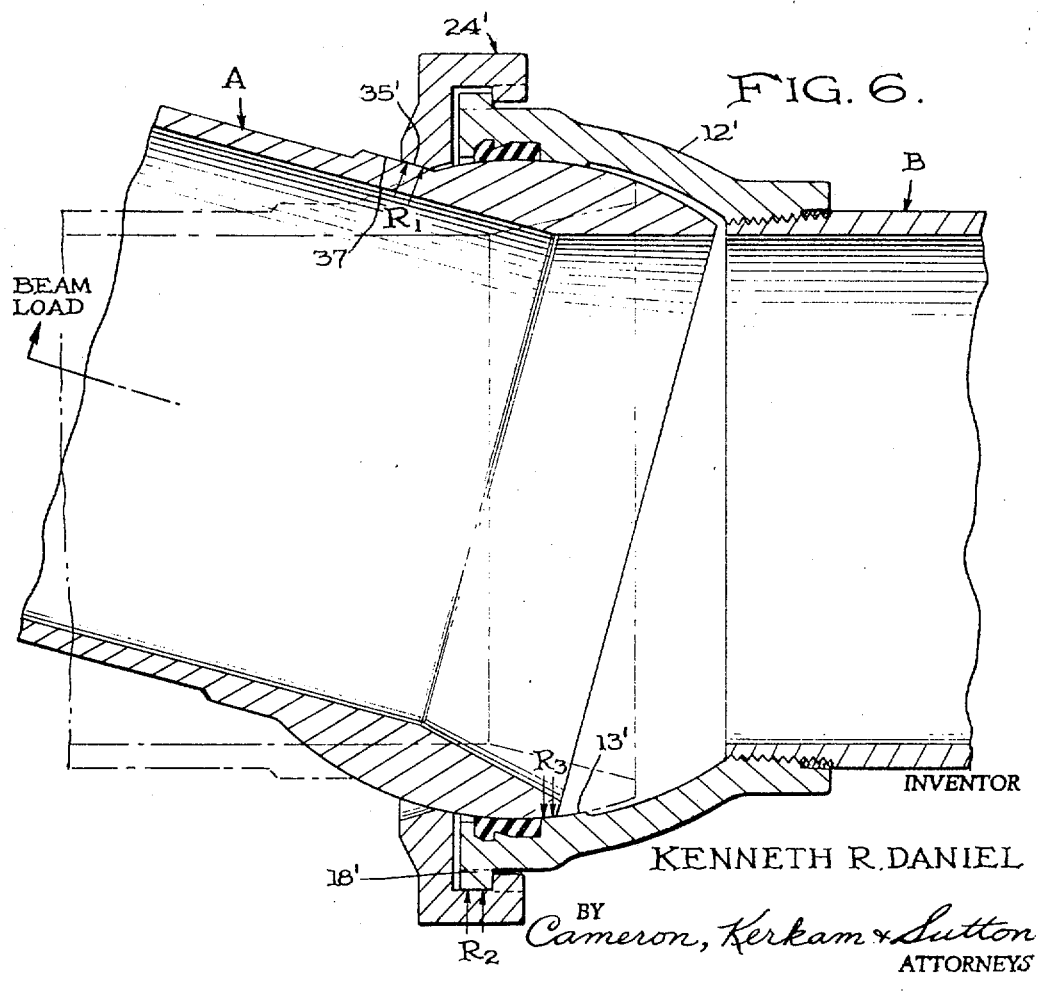

3,276,796
BOLTLESS FLEXIBLE PIPE JOINT
Kenneth R. Daniel, Birmingham, Ala., assignor to American Cast Iron Pipe Company, Birmingham, Ala., a corporation of Georgia
Filed Dec. 13, 1965, Ser. No. 513,384
4 Claims. (Cl. 285—261)

This is a continuation-in-part of application Serial No. 332,450, filed December 23, 1963 now abandoned.

The present invention relates to pipe joints and couplings of the ball and socket type, and more particularly to an improved boltless, flexible joint for coupling the ball and bell ends of adjacent cast iron pipe sections together in a positively locked, leak-proof manner.

While various types of flexible pipe joints have been proposed heretofore, many difficulties have been experienced in providing a joint of this character which is truly leak-proof and which will withstand severe in-service load conditions resulting from external beam loading, particularly when deflected to the normally specified maximum angularity of 15°. For example, some known flexible couplings, while intended to provide leak-proof service in installations over irregular terrain or through turbulent waterways, embody ball and socket members of such construction that deflections of the pipe sections of less than 15° responsive to external loads tends to cause leakage and to exert tensional stresses on the socket members which are apt to cause breakage of the latter.

Accordingly, the primary object of the present invention is to provide an improved boltless, flexible pipe joint having complementary ball and bell members and improved annular coupling means which are operative to distribute the loads and stresses resulting from beam loading and to exert compressive forces on the components of the joint when the latter is fully deflected.

Another object is to provide an improved pipe joint of the character described having sealing means disposed in such a manner that any fluid tending to leak through the joint will exert a self-sealing pressure on the sealing means irrespective of the flexed positions of the pipe sections.

A further object is to provide an improved boltless flexible pipe joint which embodies a flanged bell or socket member having a plurality of marginal slots in the flange thereof adapted to receive a plurality of complementary lugs formed on an annular locking gland which overlays the bell flange and is adapted to be rotated relative thereto to securely lock the joint.

These and other objects and advantages will become more apparent upon consideration of the following detailed description of two preferred embodiments of the invention. In this connection, although only two specific forms of pipe joint are illustrated in the accompanying drawings, it is to be understood that these drawings are exemplary only and are not to be construed as defining the limits of the invention, for which latter purpose reference should be made to the appended claims.

In the drawings, wherein like parts are represented by like reference numerals throughout:

FIG. 1 is an end elevation view of one form of the improved pipe joint of this invention, looking from the left in FIG. 2 and with a portion of the locking gland broken away to show the end of the bell;

FIG. 2 is a longitudinal cross-sectional view of the joint taken substantially on line 2—2 of FIG. 1;

FIGS. 3 and 4 are end elevations, on a reduced scale, of the locking gland and the bell, respectively, of the joint shown in FIGS. 1 and 2;

FIG. 5 is a fragmentary longitudinal cross-sectional view of another form of joint embodying the invention; and FIG. 6 is a full cross-sectional view of the joint of FIG. 5 showing the positions of the parts and indicating the distribution of the beam load and stresses when the joint is reflected to its maximum angularity.

Referring now to FIGS. 1–4, it will be seen that the improved joint or coupling of the present invention is adapted to interconnect adjoining lengths of pipe designated generally A and B, each pipe length having an integrally cast ball portion 10 at one end and a complementary formed, integrally cast socket or bell portion 12 at the opposite end. The bell portion 12 is provided with a spherical inner surface 13 which conforms to and is normally in seating engagement with the spherical outer surface of ball portion 10, and with an annular recess or cavity 14 adjacent the outer open end of the bell adapted to receive an annular deformable rubber sealing gasket 16. The recess and gasket are preferably of substantially the same form as the corresponding elements disclosed in U.S. Patent No. 2,991,092, dated July 4, 1961, to which reference may be had for the specific details thereof. Bell portion 12 is further provided with a radially outwardly extended annular flange 18 having a front face coplanar with the outer open end of the bell, an oppositely disposed rear face and a plurality of circumferentially spaced slots or notches 20 in the periphery thereof, which slots are of such length and spacing as to receive complementally formed lugs 22 provided on a locking gland 24, described in more detail hereinafter.

The inside diameter 26 of the open or entrance end of bell portion 12 is slightly larger than the maximum outside diameter of the ball portion 10 so as to permit insertion of the ball into the bell, after installation of the gasket 16 in cavity 14 in the manner described in the above-mentioned Patent No. 2,991,092.

The locking gland 24, which is preferably made of ductile iron, is designed to overlay the flange 18 of bell 12, and comprises a solid, i.e., unsplit, annular wall or collar 27 which extends radially outwardly from the ball 10 and has a stepped or shouldered inner peripheral surface, designated generally at 28, slightly larger in minimum diameter than the maximum diameter of ball 10 to enable passage of the gland over the ball during assembly of the joint. An annular steel retainer or thrust ring 30, having a stepped or shouldered outer peripheral surface 32 complementary to the inner peripheral surface 28 of the gland 24, is provided with an inner spherically contoured surface 34 which is complementary to, but of substantially less arcuate extent than, the outer spherical surface of ball 10, and the maximum diameter of which is less than the maximum diameter of the ball. As shown in FIG. 2, the surface 34 of ring 30 is spaced slightly from the surface of ball 10 when the joint is not subject to forces which tend to separate the joint endwise. As indicated at 36, ring 30 is of split construction to permit it to be sprung over the ball 10 and seated in the shouldered inner surface 28 of gland 24 prior to assembly of the joint.

The locking gland 24 also includes an outer wall 38 which extends axially from radial wall 27 toward, and is adapted to overlay, the outer periphery of flange 18 of the bell portion 12 of pipe B. The wall 38 has formed integrally therewith a plurality of peripherally spaced, radially inwardly directed lugs 22 which, as mentioned above, are adapted to pass through the slots or notches 20 in bell flange 18 and to engage the rear face of said flange so as to lock the assembled joint together when the gland 24 is rotated to the position shown in FIG. 1, in the manner of a bayonet-type joint. The lugs 22 and the portions of flange 18 between slots 20 may be provided with complemental cam surfaces to help draw the joint into tighter engagement.

In order to properly distribute the loads and stresses resulting from external beam loading when the joint is fully deflected, the thrust ring 30 is provided with an angular, outwardly flared surface 35 which extends away from the ball 10 at an angle with respect to the central axis of the ring 30 and gland 24 substantially equal to the maximum deflection angle of the joint, i.e., 15° in the present instance, and which is adapted to cooperate with an annular load-distributing shoulder 37 formed on pipe A just behind the ball 10.

As will more clearly appear from FIG. 6 hereinafter described, when the joint is deflected at the maximum angle of 15°, shoulder 37 comes into load-transferring abutment with surface 35 on the "closed" side of the joint, and thereby increases the allowable beam load since this is the area of greatest stress. Abutment of shoulder 37 against surface 35 also raises the gland 24 radially relative to the flange 18 of the bell 12 so that the outer wall 38 of the gland at the diametrically opposite "open" side of the joint applies a compressive force against the periphery of the bell flange. In this manner, the joint is placed in compressive stress, an advantageous condition particularly in the case of cast iron pipe because cast iron is much stronger under compression than in tension.

Referring now to FIGS. 5 and 6, the pipe joint illustrated therein embodies the same novel arrangement of the principal elements of the joint as that of FIGS. 1–4, but differs from the latter in two respects. First, the bell portion 12' of FIGS. 5 and 6 is cast separately from and then secured to pipe section B by a screw-threaded connection 40, instead of being cast integrally with the pipe as shown in FIG. 2. Second, in FIGS. 5 and 6, the thrust ring 30 of the first embodiment has, in effect, been made integral with the annular wall or collar 27' of locking gland 24', so that spherically contoured surface 34' and the angular, outwardly flared surface 35' become portions of the inner peripheral surface of gland 24', instead of being formed on the thrust ring. In the thus modified construction, which is more economical to manufacture than that of FIGS. 1–4, it will be evident that the locking gland 24' must be placed on the pipe from the bell end thereof before the bell portion 12' is connected thereto, because the maximum diameter of surface 34' is less than the maximum diameter of ball 10.

FIG. 6 shows the joint of FIG. 5 in fully deflected position and indicates how the structure of the present invention distributes the loads resulting from external beam loading so as to avoid tensional stresses, it being understood that the same distribution is effected in the joint of FIGS. 1–4. As indicated, a portion $R_1$ of the beam load is transferred by the raised shoulder 37 behind the ball 10 to the angular surface 35' of gland 24' at the "closed" side of the joint, while another portion $R_3$ is transferred by the ball 10 to the inner surface 13' of bell 12' at the opposite "open" side of the joint. However, the force $R_1$ raises gland 24' in a radial direction so as to bring the overlaying wall 38' thereof up against the periphery of bell flange 18' at the "open" side of the joint and thus transfer the load imposed on the gland at $R_1$ to the outside of the bell at $R_2$. Consequently, one side of bell 12' is subjected to compressive stresses by loads $R_2$ and $R_3$, while the opposite side of the bell receives no stress from the beam loading. The load and stress conditions thus produced provide the joints of the present invention with increased strength and sealing capability in comparison with the joints of the prior art which either make no provision for reducing the effects of external beam loading when the joints are fully deflected, or are subject to undesirable tensional stresses in the bell portion of the joint.

The method of assembling the improved couplings of the present invention will be apparent from the foregoing description and need not be described in detail. It will also be apparent that these flexible pipe joints, which require no securing bolts or similar devices, are of such construction that the pressure of fluid within the pipe, and external stresses or deflecting loads imposed thereon, will result only in tightening the joint structure, thus positively precluding any leakage of the joint from within or without.

While only two specific forms of the invention have been described and illustrated herein, it will be obvious that various changes in the mechanical details thereof may be made by those skilled in the art without departing from the inventive concept as defined in the appended claims.

What is claimed is:

1. A flexible joint for coupling ball and socket type pipe sections together, comprising a ball member having a spherical outer surface on the end of one pipe section and a socket member on the adjacent end of another pipe section partially surrounding said ball member, said socket member being of belled, open end configuration and having an annular flange extending radially outwardly from the open end thereof, said flange having a front face coplanar with the open end of said socket member, an oppositely disposed rear face and a plurality of circumferentially spaced locking slots in the periphery thereof, an annular cavity in the inner surface of said socket member positioned axially inwardly of the belled open end thereof, a deformable annular gasket seated in said cavity in sealing engagement with the spherical outer surface of the ball member and said cavity, an annular locking structure mounted on said ball member having an inner peripheral surface which includes a spherical portion complementary to and normally slightly spaced from the spherical outer surface of said ball member and an angular portion extending away from said ball member at an angle with respect to the axis of said locking structure which is substantially equal to the maximum intended deflection angle of the joint the maximum diameter of said inner peripheral surface being less than the maximum outer diameter of said ball member, said locking structure including a radially extending wall parallel to the radially extending flange of said socket member and an axially extending wall having an inner diameter greater than the outside diameter of said flange, said axially extending wall having a plurality of circumferentially spaced locking lugs extending radially inwardly therefrom and being adapted to overlay and encircle the flange of said socket member after passage of said locking lugs through the locking slots of said flange, said locking structure being rotatable relative to said flange to bring said locking lugs into engagement with the rear face of said flange and thereby lock the joint against axial separation, but permitting limited radial movement between said flange and said locking structure, and an annular load-transferring surface on said one pipe section adjacent said ball member adapted to abut the angular portion of the inner peripheral surface of said locking structure when the joint is fully deflected, whereby said locking structure is movable in a radial direction relative to the flange of said socket member so as to apply a compressive stress to said socket member when the joint is fully deflected.

2. A joint as defined in claim 1 wherein the inner surface of the socket member axially inward of the gasket cavity is spherical in form and is normally in engagement with the spherical outer surface of the ball member.

3. A joint as defined in claim 1 wherein the socket member is detachably connected to the end of said other pipe section, and said annular locking structure is an integral casting.

4. A joint as defined in claim 1 wherein the socket member is formed integrally with said other pipe section, and said annular locking structure comprises a solid gland member of which said radially extending wall and axially extending wall are integral parts, the radially extending wall part having a shouldered inner peripheral surface the minimum inner diameter of which is greater than the maximum diameter of said ball member, and a split thrust ring having a shouldered outer peripheral surface complementary to the shouldered inner peripheral surface of said gland member, the spherical and angular portions of the inner peripheral surface of said locking structure being formed on said thrust ring, the shouldered surfaces of said gland member and said thrust ring being so formed as to maintain the spherical portion of said inner peripheral surface in engagement with the spherical outer surface of the ball member when the joint is subjected to forces which tend to separate the joint endwise.

References Cited by the Examiner

UNITED STATES PATENTS

| | | | |
|---|---|---|---|
| 855,739 | 6/1907 | Wilcox | 285—271 |
| 1,568,649 | 1/1926 | Woodruff | 285—271 |
| 2,151,833 | 3/1939 | Buyatti | 285—271 |
| 2,158,131 | 5/1939 | Laurent | 285—360 X |
| 2,991,092 | 7/1961 | Mackay | 285—110 |

CARL W. TOMLIN, *Primary Examiner.*

D. W. AROLA, *Assistant Examiner.*